Sept. 29, 1931.  P. TURA  1,825,562

VALVE KEY

Filed June 28, 1930

Inventor:
Paolo Tura,
by Langner, Parry, Card & Langner
Attys.

Patented Sept. 29, 1931

1,825,562

UNITED STATES PATENT OFFICE

PAOLO TURA, OF TREVIGLIO, NEAR MILAN, ITALY, ASSIGNOR TO THE FIRM VEREINIGTE THURINGER METALLWARENFABRIKEN, A. G., OF ZELLA-MEHLIS, GERMANY

VALVE KEY

Application filed June 28, 1930, Serial No. 464,615, and in Italy November 28, 1929.

This invention relates to valves for pressure containers, particularly for inflatable objects.

The invention provides a key for a valve, which permits of an extremely easy pumping and deflating operation.

According to the invention this is obtained by the use of a valve in which the closing force is rendered inactive upon pumping by a member capable of being connected with the valve housing by a member acting on the valve itself, so that the valve itself is rendered inoperative during pumping in the manner known in conection with the non-guided ball valves.

A key provided in known manner with screw-threaded ends is employed with particular advantage for rendering the valve inoperative, but the key in accordance with the invention, contains a return valve and is capable of being screwed with either of its ends as desired into the valve housing. When one end of the key is screwed into position the return valve thereof is active during pumping and the closing valve of the closure valve arrangement is inactive. When the key is unscrewed after the pumping operation the closing valve becomes active. If the key is turned upside down and the reverse end is screwed into position the closing valve is again rendered inactive. The return valve is then also inactive however, so that the air may escape unhindered.

In the accompanying drawings several examples of carrying the invention into effect are illustrated by way of example.

Figure 1:
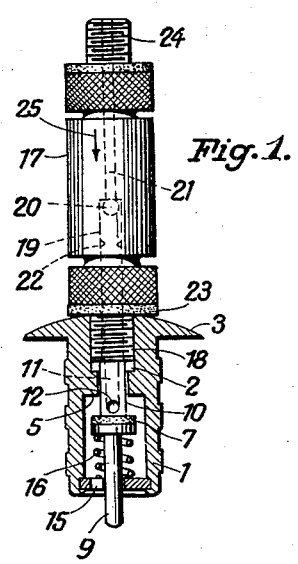
Figure 1 is an axial sectional elevation of a valve with a key screwed therein, the key not being shown in section.

In the device a ball valve 20 is lodged in a relatively wide bore of the key 17. The ball 20 is capable of rendering a narrow bore 21 air-tight but is itself prevented from dropping out owing to the provision of small projections 22 or the like.

An air-tight joint between the key 17 and the curved head 3 of the valve body is effected by a packing washer 23.

If an air pump (which may be an ordinary bicycle pump without a pressure valve) is screwed on the upper screw-threaded part 24 of the key 17 then upon operation of the pump the air is forced in the direction of the arrow 25 through the bore 21 and past the valve ball 20 and then through bores 19, 11, 12 and apertures 15 into the bladder of the ball. The valve 7 is thus completely inactive, escape of air only being prevented by the light floating ball valve 20 which is not in need of soft packing. As a consequence the pumping operation is effected very easily and conveniently.

When the key 17 is unscrewed the valve 7 is forced onto its seating under the action of the strong spring 16 and the pressure of the air.

Figure 2:
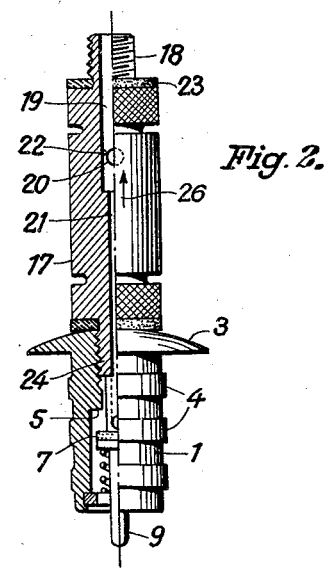
Figure 2 is a half sectional elevation of the valve with the key screwed therein.
Figure 3:
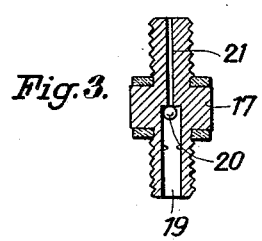
Figure 3 is a sectional elevation of a second form of key according to my invention.

In order to deflate the ball or the like, the screw-threaded part 24 of the key 17 is screwed into the valve casing 1, i. e. in a reverse position to that shown in Figure 1. Figure 2 shows this condition. The valve 7 is forced back exactly as in the case of Figure 1, and thereby rendered inactive. The ball valve 20 can no longer prevent escape of air, however, as it is forced by the air pressure prevailing in the ball away from the narrow bore 21 and along the wide bore 19. The air can therefore escape in the direction of the arrow 26 along the path reverse to that previously described.

It is, of course, obvious that the invention, once disclosed, is susceptible to numerous modifications and adaptations. Accordingly, it is intended that the invention be limited only by the scope of the appended claims.

What I claim is:

1. A reversible key for controlling valves, comprising a body portion having a bore therein, a check valve in said bore, and attachment portions at each end of the bore, the said attachment portions each being of sufficient length to depress the valve stem of the valve to which they are attached.

2. A reversible key for controlling a valve, the said key having a valve therein adapted for closing in but one of the two operable positions of the key with respect to the first-mentioned valve.

In testimony whereof I have signed my name to this specification.

PAOLO TURA.